(12) United States Patent
Brunelli et al.

(10) Patent No.: US 11,473,766 B2
(45) Date of Patent: Oct. 18, 2022

(54) EXIT LIGHT WITH PLUG-IN HOUSING

(71) Applicant: Hubbell Lighting, Inc., Shelton, CT (US)

(72) Inventors: Anthony Brunelli, Piedmont, SC (US); Robert Papstein, Greenville, SC (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

(21) Appl. No.: 17/171,491

(22) Filed: Feb. 9, 2021

(65) Prior Publication Data
US 2021/0180782 A1    Jun. 17, 2021

Related U.S. Application Data

(63) Continuation of application No. 15/905,105, filed on Feb. 26, 2018, now Pat. No. 10,935,225.
(Continued)

(51) Int. Cl.
| | |
|---|---|
| *F21V 23/06* | (2006.01) |
| *F21V 17/16* | (2006.01) |
| *F21S 9/02* | (2006.01) |
| *F21V 14/02* | (2006.01) |
| *F21V 23/00* | (2015.01) |
| *F21V 21/02* | (2006.01) |
| *H01R 13/60* | (2006.01) |

(Continued)

(52) U.S. Cl.
CPC ............... *F21V 23/06* (2013.01); *F21S 9/02* (2013.01); *F21S 9/022* (2013.01); *F21V 14/02* (2013.01); *F21V 17/16* (2013.01); *F21V 23/008* (2013.01); *H01R 13/60* (2013.01); *H02G 3/10* (2013.01); *H02G 3/14* (2013.01); *H02G 3/16* (2013.01); *F21V 21/02* (2013.01); *H02G 3/085* (2013.01)

(58) Field of Classification Search
CPC .......... F21S 9/02; F21S 9/022; F21V 23/008; H02G 3/10; H02G 3/14
See application file for complete search history.

(56) References Cited

U.S. PATENT DOCUMENTS

| 4,355,479 A | 10/1982 | Thornton |
| 5,485,145 A | 1/1996 | Sniff |

(Continued)

FOREIGN PATENT DOCUMENTS

| CN | 2881321 | 3/2007 |
| CN | 103003623 | 3/2013 |

(Continued)

OTHER PUBLICATIONS

PCT/US2018/019716 International Search Report and Written Opinion dated May 17, 2018.
(Continued)

*Primary Examiner* — William N Harris
(74) *Attorney, Agent, or Firm* — Michael Best & Friedrich LLP (57) ABSTRACT

A lighting device includes a housing and a light emitter coupled to the housing. A mounting plate is coupled to the housing and includes a front surface facing the housing and a rear surface opposite the front surface. The rear surface includes a snap-fit mounting feature and a rear connector portion. A first connector is coupled to the rear connector portion and operatively coupled to the light emitter.

20 Claims, 10 Drawing Sheets

Related U.S. Application Data

(60) Provisional application No. 62/463,916, filed on Feb. 27, 2017.

(51) Int. Cl.
  *H02G 3/14* (2006.01)
  *H02G 3/16* (2006.01)
  *H02G 3/10* (2006.01)
  *H02G 3/08* (2006.01)

(56) References Cited

U.S. PATENT DOCUMENTS

| | | | |
|---|---|---|---|
| 5,768,814 A * | 6/1998 | Kozek | G09F 13/14 40/570 |
| 5,797,673 A * | 8/1998 | Logan | G09F 13/04 362/234 |
| 5,914,665 A | 6/1999 | Thorp | |
| 6,132,070 A | 10/2000 | Vosika et al. | |
| 6,133,843 A | 10/2000 | Davidson | |
| 6,410,850 B1 | 6/2002 | Abel | |
| 6,838,997 B1 | 1/2005 | Davidson | |
| 10,395,569 B2 * | 8/2019 | Gow | G02B 6/0005 |
| 2003/0090896 A1 | 5/2003 | Sooferian | |
| 2006/0072304 A1 * | 4/2006 | Lay | F21S 9/022 362/157 |
| 2008/0013326 A1 | 1/2008 | Den Boer | |
| 2016/0305637 A1 | 10/2016 | Brunelli | |
| 2016/0312968 A1 | 10/2016 | Bruneli et al. | |

FOREIGN PATENT DOCUMENTS

| | | |
|---|---|---|
| CN | 103867975 | 6/2014 |
| CN | 105465698 | 4/2016 |

OTHER PUBLICATIONS

Chinese Patent Application No. 201880018805.0 First Office Action issued by the China National Intellectual Property Administration dated Jun. 28, 2020, with translation.

* cited by examiner

EXIT LIGHT WITH PLUG-IN HOUSING

RELATED APPLICATION(S)

This application is a continuation of U.S. Ser. No. 15/905,105, filed Feb. 26, 2019, which claims priority to U.S. Provisional Application Ser. No. 62/463,916, filed Feb. 27, 2017, the disclosures of which are incorporated herein by reference in their entirety and to which priority is claimed.

FIELD

Various embodiments relate to light fixtures, for example exit lights.

BACKGROUND

Light fixtures are commonly used in public and commercial buildings to indicate and illuminate areas such as stairs and exits in the event of a power failure. These fixtures typically have an emergency backup power system such as a battery that automatically turns on the emergency light when the primary power source is interrupted.

These light fixtures are typically hung on a wall or ceiling, and are connected to a high-voltage power supply to charge the battery and to operate the unit under normal conditions. Replacing these fixtures can be difficult and expensive due to their location and the need to have a licensed electrician make the appropriate high-voltage connections.

SUMMARY

A lighting device includes a housing and a light emitter coupled to the housing. A mounting plate is coupled to the housing and includes a front surface facing the housing and a rear surface opposite the front surface. The rear surface includes a snap-fit mounting feature and a rear connector portion. A first connector is coupled to the rear connector portion and operatively coupled to the light emitter.

A lighting device includes a housing and a light emitter coupled to the housing. A mounting plate coupled to the housing and has a front surface facing the housing and a rear surface opposite the front surface. Aa first connector is coupled to the rear connector portion and operatively connected to the light emitter. A second connector is configured to be coupled to a power supply. The first connector is configured to mate with the second connector.

A lighting assembly includes a housing at least partially defining a chamber containing a control component for a light emitter. A mounting plate having a front portion facing the chamber and a rear portion positioned opposite the chamber. A first connector and a first snap-fit feature extend from the rear portion. A junction box includes a plurality of walls. A second snap-fit feature is provided on at least one of the walls. A second connector is positioned in the junction box. The first snap-fit feature mates with the second snap fit feature and the first connector mates with the second connector.

A method of installing a quick-change lighting assembly. A first electrical connector is wired to a power supply. The first electrical connector is coupled to a junction box. A lighting assembly is coupled to the junction box. The lighting assembly includes a mounting plate and a second electrical connector extending from the mounting plate. The second electrical connector mates with the first electrical connector when the lighting assembly is coupled to the junction box.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

FIGS. 1-10 show an exemplary embodiment of an emergency lighting assembly 10. The lighting assembly includes a housing 12, one or more lamps 14, and a door 16 covering a battery compartment 18. The housing 12 in the illustrated exemplary embodiment has a front wall 20, inclined side walls 22, an inclined top wall 24, and an inclined bottom wall 26. Rounded corners 28 or other transitions can connect the walls. Slots 23 are provided in the side walls 22 and the top wall 24. One or more of the walls 22, 24, 26 can include one or more knockouts 29. For example, a knockout 29 can be positioned in both of the side walls 22 and the top wall 24. The knockouts 29 can be selectively removed to provide one or more wire openings for the housing 12.

The lamps 14 extend through openings in the housing, for example, positioned mainly in the rounded corners 28. Side walls 22 are oriented at an incline with respect to the front wall 20 to direct light in a generally outward and forward direction with respect to the housing 12. The housing 12 and lamp 14 can have various alternative configurations depending on the desired light output, strength, and direction. The housing 12 can be made from a molded plastic material, metal, composite, or other suitable rigid material.

Each of the lamps 14 can be independently adjusted to direct the beam of light produced from the lamp 14 to a selected area. In an exemplary embodiment, the lamps 14 can pivot and swivel within a socket in the housing 12. The lamps 14 can include any suitable light source, for example light emitting diodes (LED) or halogen light sources.

The light assembly 10 is connected to a main power source (not shown) and includes a battery 25 for providing auxiliary power. In an exemplary embodiment, the internal circuitry and the lamps 14 are connected to the battery by wires or another electrical connection. The light assembly 10 is then connected to a main power source to maintain the battery 25 in a charged condition. Typically, the light assembly 10 is wired to an electrical junction box or electrical receptacle as known in the art. Circuitry actuates the lamps 14 when certain conditions are present, for example an alarm is activated or the primary source of power is interrupted.

As best shown in FIGS. 3-6, the exemplary housing includes a compartment 18 for housing the battery 25. The compartment 18 is accessible through the front of the housing 12 without removing the housing 12 or otherwise exposing high voltage components (e.g. conductors or circuitry). The compartment 18 is covered by a moveable door 16 that can be selectively opened and closed by a user. The battery 25 can be secured in the housing 12 by a strap 27. The strap 27 can be feed through one or more slots in the compartment 18. The strap 27 can utilize a releasable fastener, for example a hook-and-loop fastener, buckle, clip, etc.

The front wall 20 includes a depression 30 adjacent the compartment 18 opening and a boss 32 extending into the compartment 18. The compartment 18 includes a bottom wall 34, top wall 36, side walls 38 extending from the front wall 20 toward the rear of the housing 12, and a back wall 40 connected to one or more of the other walls 34, 36, 38. The top wall 36 can include an undercut portion and the back wall 40 can include a slot for receiving the strap 27.

Figure 1:
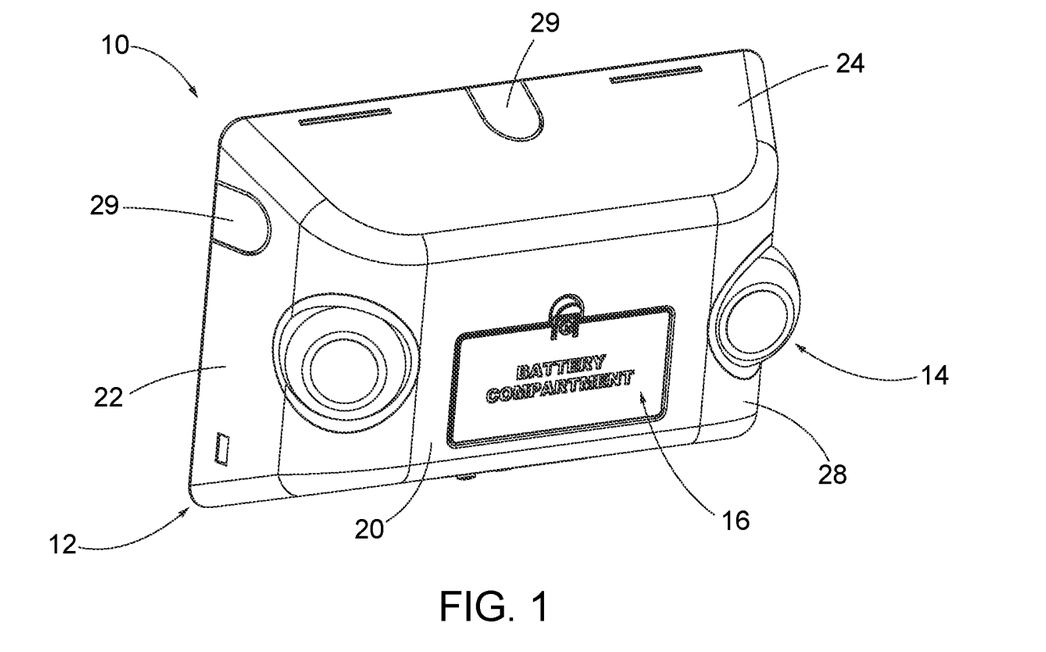
FIG. 1 is a top perspective view of an exemplary emergency light assembly.
Figure 2:
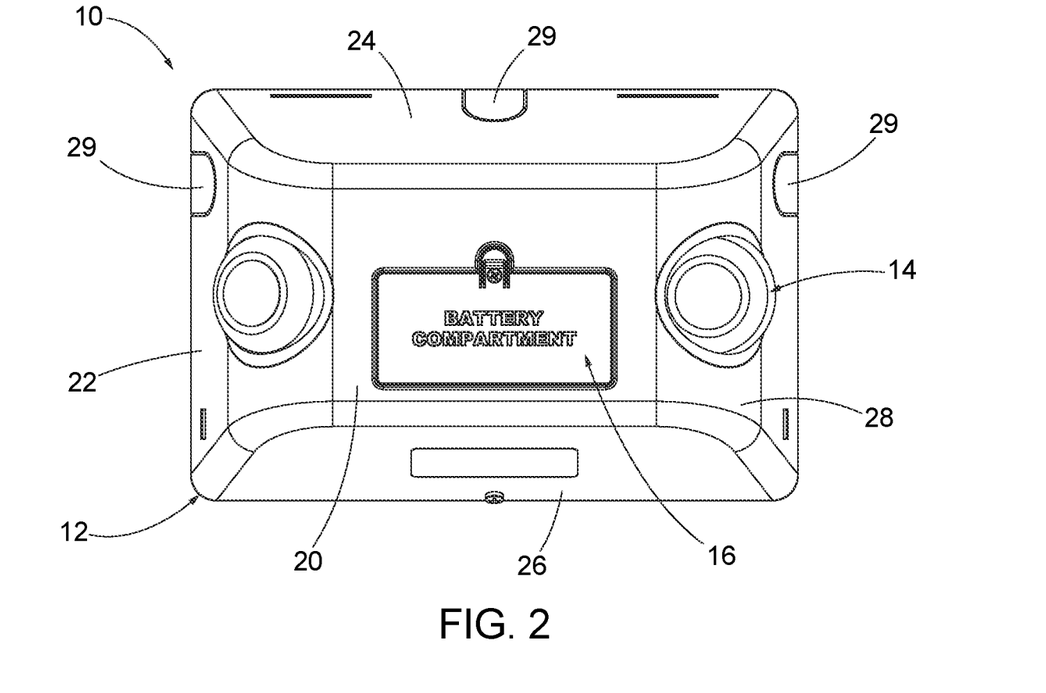
FIG. 2 is a front view of the light assembly of FIG. 1.
Figure 3:
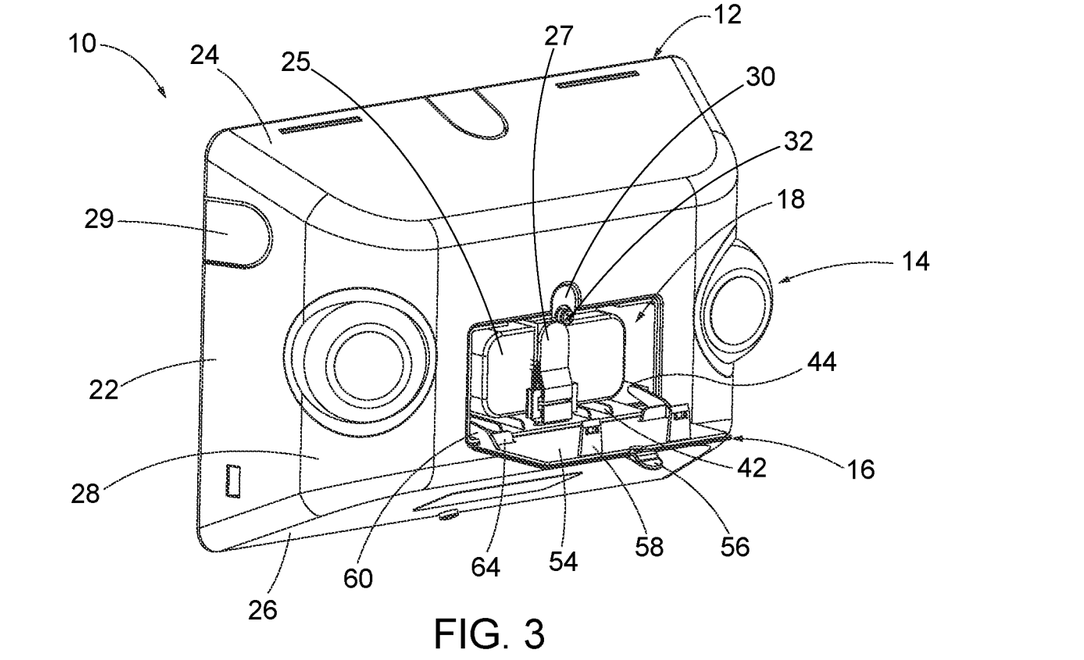
FIG. 3 is a top perspective view of the light assembly of FIG. 1 with the compartment door in the open position.
Figure 4:
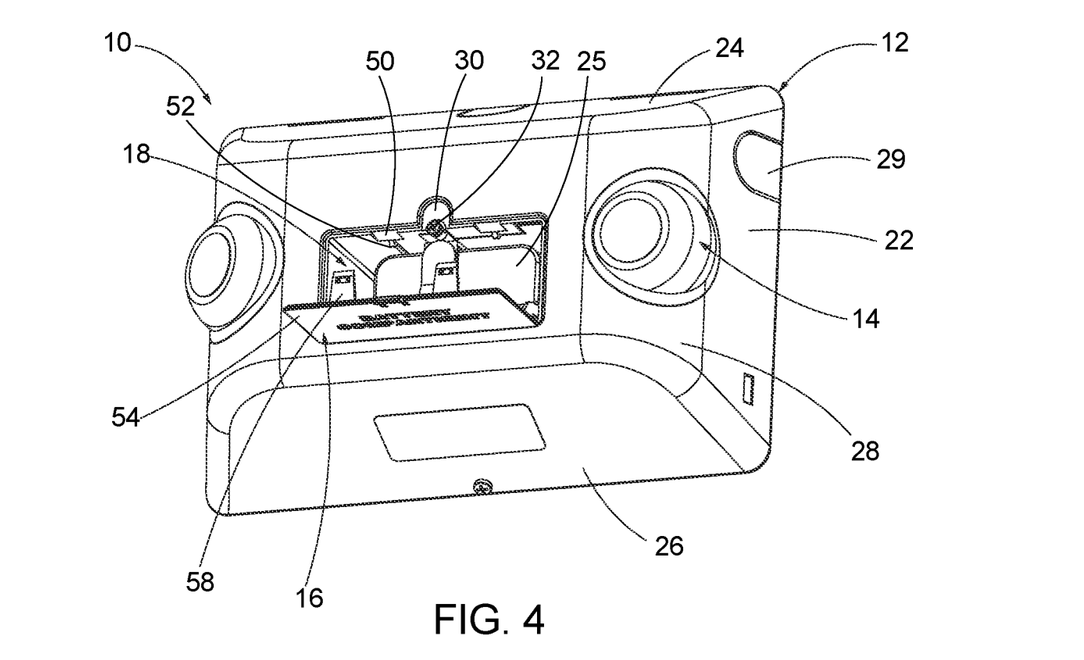
FIG. 4 is a bottom perspective view of the light assembly of FIG. 3.
Figure 5:
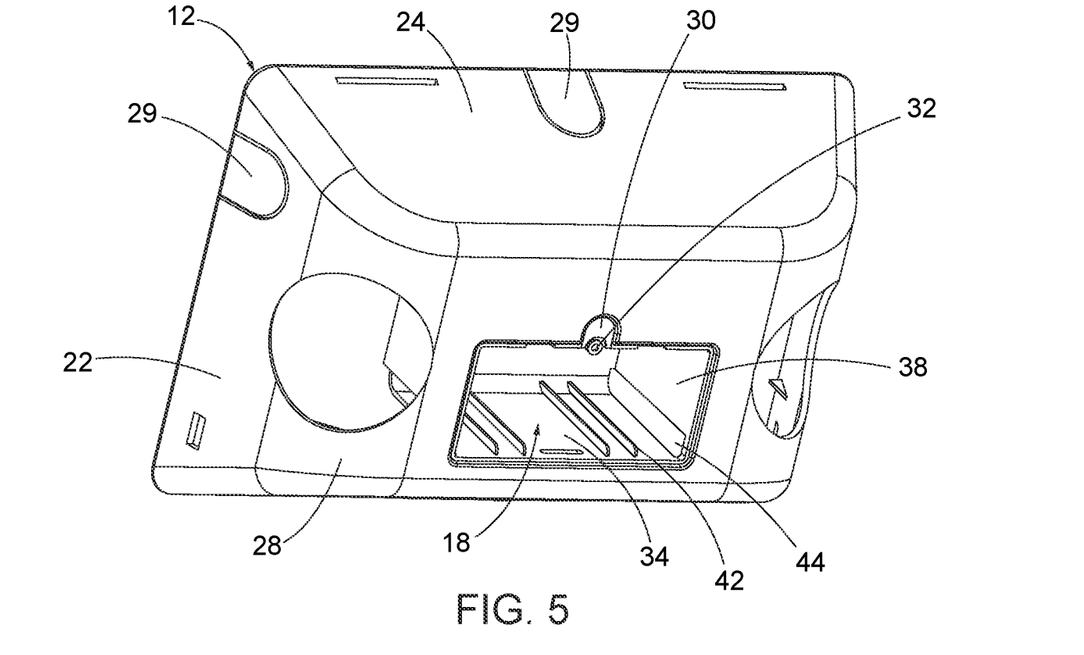
FIG. 5 is a top perspective view of the housing of the light assembly of FIG. 1.
Figure 6:
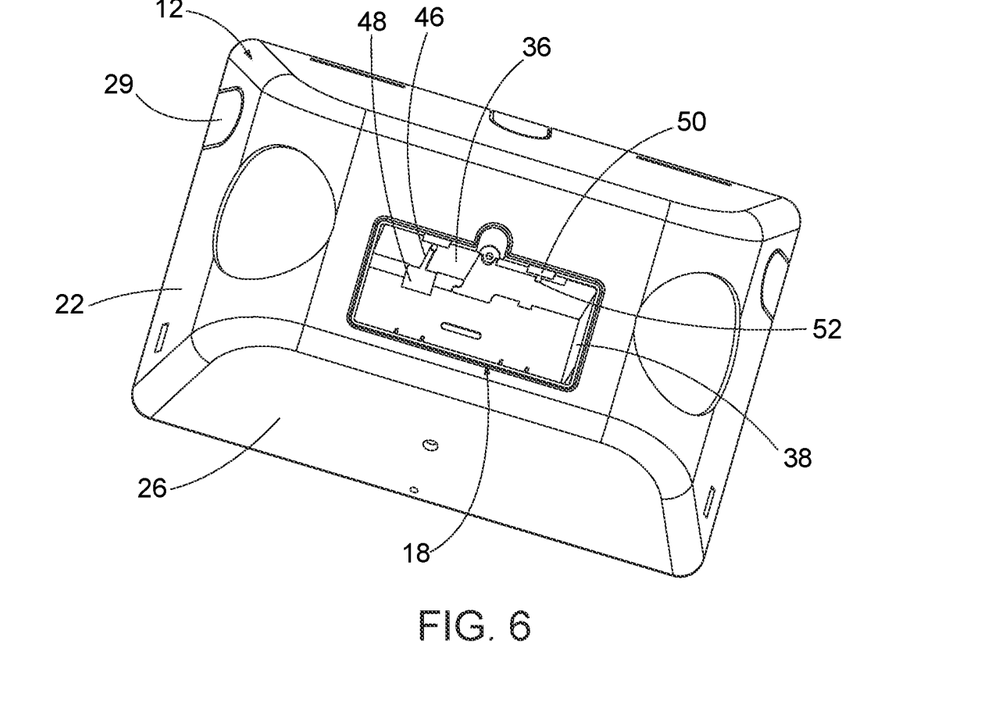
FIG. 6 is a bottom perspective view of the housing of FIG. 5.
Figure 7:
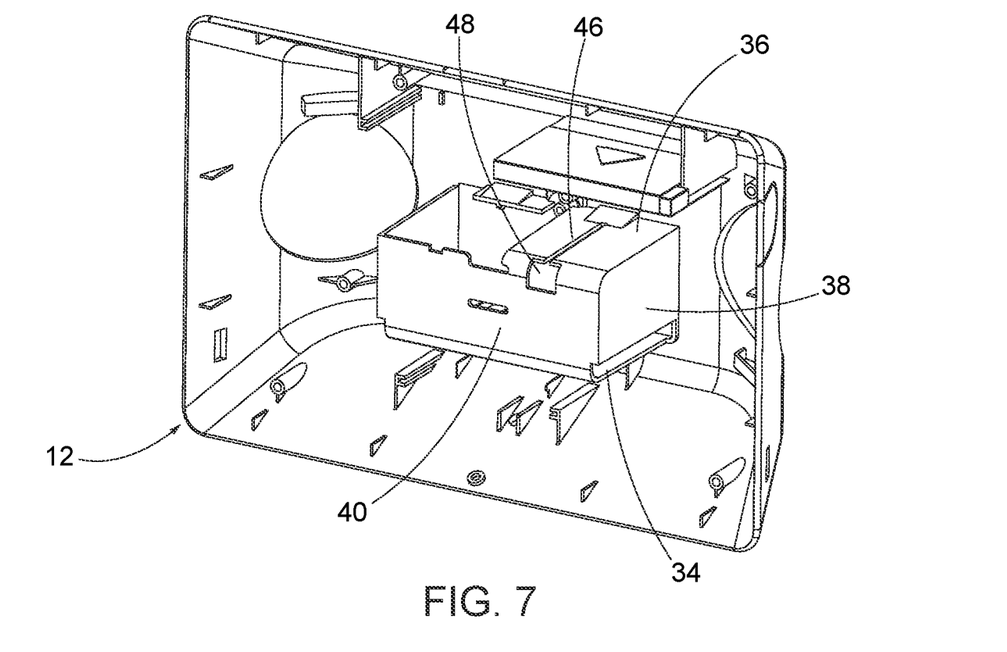
FIG. 7 is a rear perspective view of the housing of FIG. 5.
Figure 8:
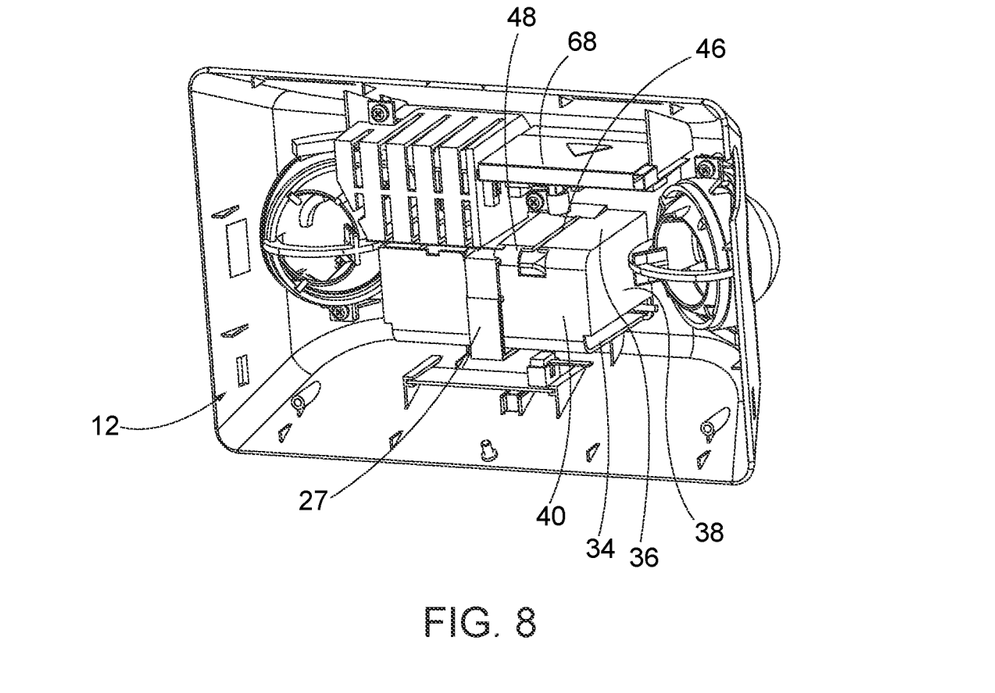
FIG. 8 is a rear perspective view of the light assembly of FIG. 1.

In an exemplary embodiment, the bottom wall 34 includes one or more sets of protrusions 42 defining a groove. Slots 44 are positioned adjacent the bottom wall 34 and the side walls 38 to retain the door 16. The top wall 36 extends at least partially over the compartment 18 and includes a channel 46 and an aperture 48 that extends into and through the back wall 40 as best shown in FIGS. 7 and 8. One or more angled grooves 50 and projections 52 are provided in the compartment 18. For example a first angled groove 50 and projection 52 are provided on the top wall 36 and a second angled groove 50 and projection 52 are provided on a flange extending over the compartment 18. The grooves 50 and projections 52 are configured to engage the door 16.

Figure 9:
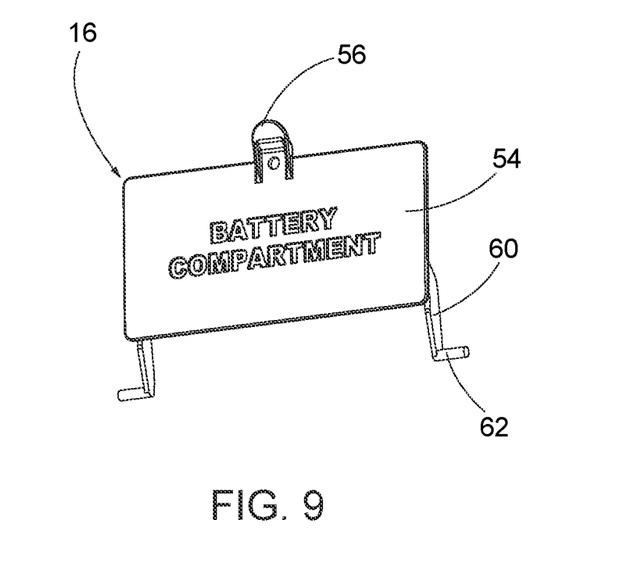
FIG. 9 is a front perspective view of the door of FIG. 1.
Figure 10:
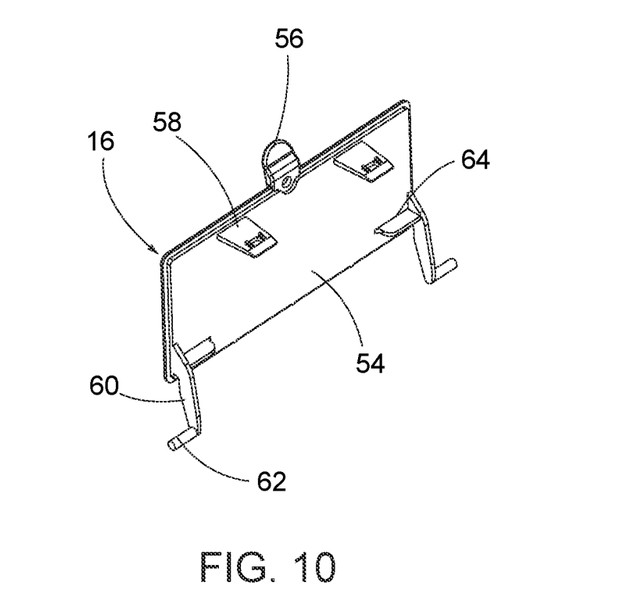
FIG. 10 is a rear perspective view of the door of FIG. 9.

The door 16, according to the exemplary embodiment and best shown in FIGS. 9 and 10 includes a cover 54 having a front surface and a back surface. An angled tab 56 extends upward from the cover 54, although other alternative configurations may be used. One or more clips 58, for example first and second clips 58 having an opening, extend rearward from the back surface of the cover 54. First and second legs 60 extend downward from the back surface of the cover 54. A pin 62 extends from each of the first and second legs 60. Flaps 64 extend from the back surface of the cover 54. The cover can be made from a variety of materials, including non-conductive materials such as molded plastic, although other rigid materials may be used.

The pins 62 extend into the slots 44 to pivotally connect the door 16 to the housing 12. When the door 16 is in the closed position, the clips 58 engage the grooves 5o and projections 52 and the tab 56 rests in the depression 30. The projections 52 extend into the openings of the clips 58 to releasable secure the door 16 in the closed position. A fastener, for example a screw, can be inserted through the tab 56 and into the boss 32 to secure the cover 16 to the housing 12. The tab 56 can include an aperture for receiving the screw. Other connections, including other hinge or pivotal connections or a non-hinged, separable connection can be made between the door 16 and the housing 12.

The compartment 18 holds the battery 25 but isolates and/or limits an installer from touching high voltage components or circuits inside the housing 12. The battery's low voltage is supplied to the main unit via wires that are routed through an opening in the back of the battery compartment. The battery 25 can therefore be easily changed by a user without moving the housing 12 and without risk to injury.

As best shown in FIG. 7, the interior of the housing 12 includes various structural elements to secure required electrical components and the battery 25. The light assembly 10 contains suitable electrical components for powering and activating the lamps 14, for example electrical conductors and circuitry as shown in FIG. 8 and would be understood by one of ordinary skill in the art. Certain components, including portions of the wiring have been removed from FIG. 8 for clarity.

In an exemplary embodiment, a charger 68, for example a PCB mounted charger, is secured to the housing 12. The charger 68 can include an electrical connector that extends into the compartment 18, for example through the channel 46 or aperture 48. The electrical connector can be a series of wire conductors and a wire harness connector, although other suitable types of electrical connectors, including wire conductors or other releasable connectors can be used FIGS. 11-17 show an exemplary mounting plate 100 that can be used to connect the housing 12 to a support structure, such as a junction box 200. In an exemplary embodiment the mounting plate 100 is snap-fit to the junction box 200 and allows for a quick connect/disconnect electrical connection to be made from the junction box 100 to the emergency lighting assembly 10. The electrical connection can be a plug-in type connection that does not require a user to splice or hard-wire the electrical connection between the light housing 12 and the main power supply positioned in the junction box 100.

Figure 11:
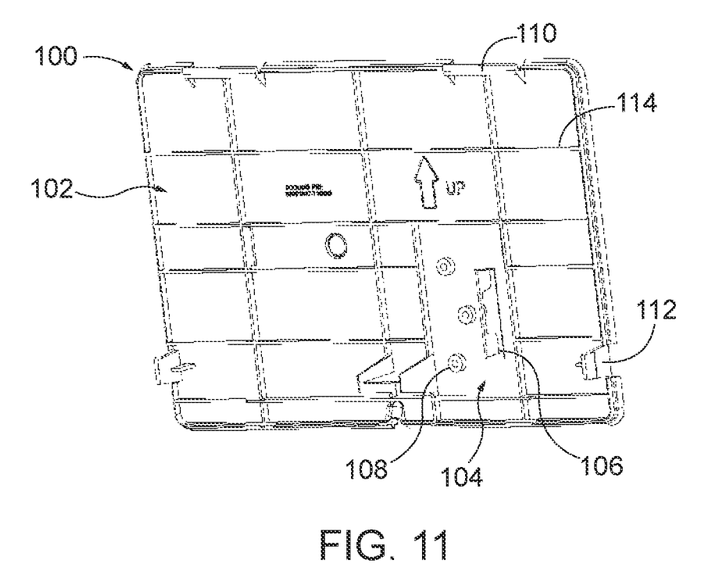
FIG. 11 is a front perspective view of an exemplary mounting plate.

FIG. 11 shows a front side of the mounting plate 100 that faces the housing 12. The front side includes a front surface 102 and front connector portion 104 positioned on the front surface 104. The front connector portion 104 includes an area that is configured to receive at least a portion of an electrical connector or connector assembly. The area can include one or more mounting features to receive the electrical connector. In an exemplary embodiment, the front connector portion 104 includes a slot 106 and a set of raised front bosses 108. A connector body and/or wiring can at least partially extend through the slot 106, while one or more of the front bosses 108 can receive fasteners to secure the connector to the mounting plate 100.

The front side of the mounting plate 100 also includes features to connect the mounting plate 100 to the housing 12. A pair of tabs no extend from the top of the mounting plate 100 and a pair of arms 112 extend from the bottom of the mounting plate 100. The arms 112 include cantilevered beams having a snap-fit hook. The tabs no are mated with the slots 23 on the top wall 24 of the housing 12 and the arms are mated with the slots 23 on the side walls 22 of the housing 12. The mounting plate 100 can be snap-fit to the housing 12 and a user can depress the tabs 110 through the slots 23 to release the mounting plate 100 from the housing 12. One or more reinforcement ribs 114 extend from the front surface 102.

Figure 12:
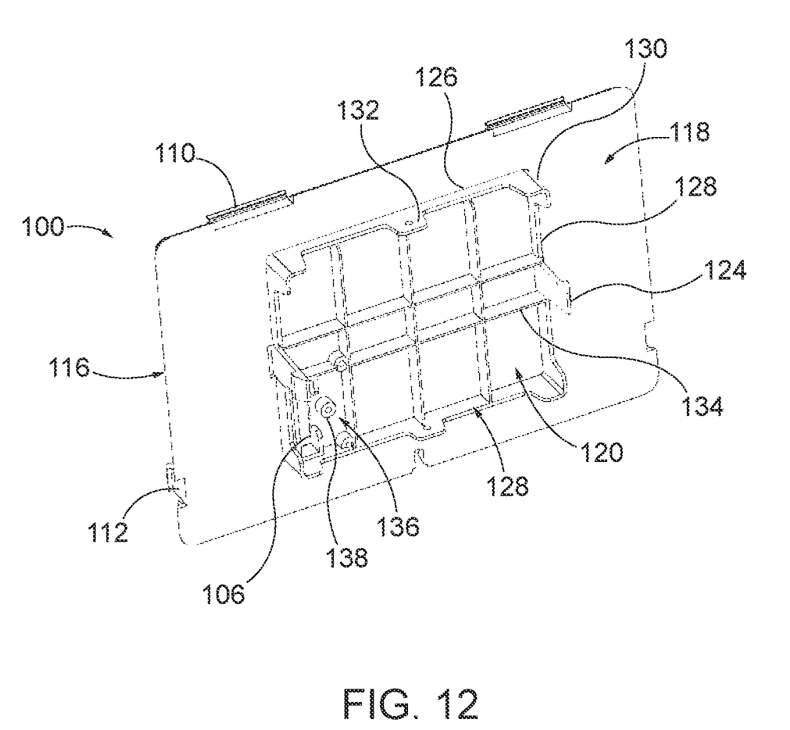
FIG. 12 is a rear perspective view of FIG. 11.
Figure 13:
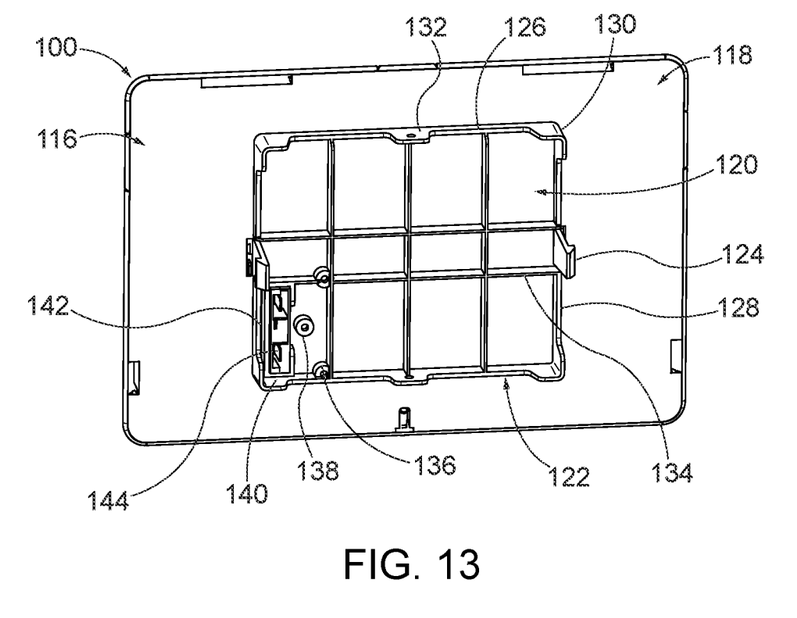
FIG. 13 is a rear perspective view of the mounting plate of FIG. 11 with a connector attached.

FIGS. 12 and 13 show a rear side of the mounting plate 100. The rear side includes a rear surface 116 having an outer region 118 and an inner region 120. In an exemplary embodiment, the inner region 120 is at least partially defined by a set of walls 122 and a pair of mounting arms 124 extending outwardly from the rear surface 116. The walls 122 include opposite top and bottom walls 126, opposite side walls 128, as well as raised corner walls 130 that extend above the other wall sections. The top and bottom walls 126 can each include a central tab 132 having an aperture. The mounting arms 124 include cantilevered beams having a snap-fit hook. One or more reinforcement ribs 134 extend from the rear surface 116.

A rear connector portion 136 is positioned in the inner region 120. The rear connector portion 136 includes an area that is configured to receive at least a portion of an electrical connector or connector assembly. The area can include one or more mounting features to receive the electrical connector. In an exemplary embodiment, the slot 106 extends through the rear connector portion 136 and a set of rear bosses 138 extend outwardly from the rear connector portion 136. A connector body and/or wiring can at least partially extend through the slot 106, while one or more of the rear bosses 138 can receive fasteners to secure the connector to the mounting plate 100. The rear bosses 138 can be aligned with the front bosses 108 so that a fastener can extend from a front boss 108 into a rear boss 138 or vice versa.

FIG. 13 shows an exemplary connector 140 attached to the mounting plate 100. The connector 140 is a female connector that includes a connector body 142 and a set of electrical contacts 144. The connector body 142 extends through the slot 106 from the front connector portion 104 to the rear connector portion 136 and is configured to mate with a corresponding male connector. The electrical contacts 144 include blades, although other contacts such as pins or tines may also be used. A wired connection can be established between the connector 140 and the lighting assembly 10.

Figure 14:
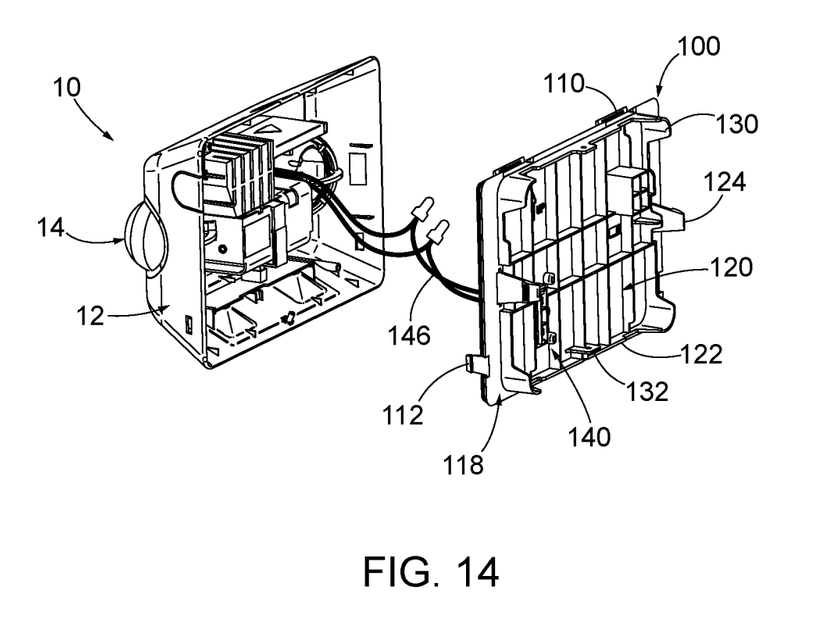
FIG. 14 is a rear perspective view of the housing and mounting plate assembly showing a wired connection.
Figure 15:
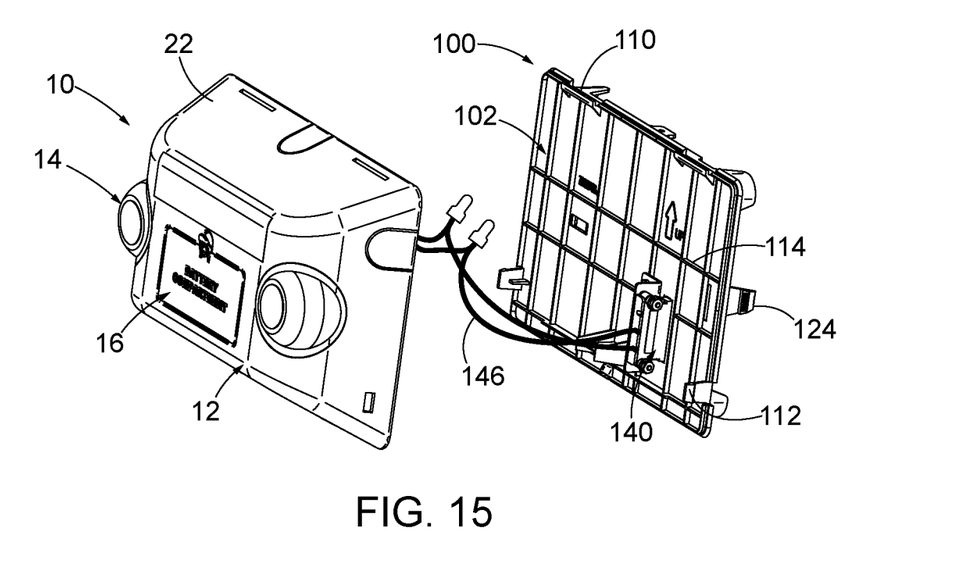
FIG. 15 is a front perspective view of FIG. 14.

As shown in FIGS. 14 and 15 the connector 140 is coupled to the front connector portion 104, with the connector body 142 extending through the slot 106. The connector 140 is then wired to the light assembly 10 through one or more conductors 146. The mounting plate 100 can then be snap-fit to the housing 12.

Figure 16:
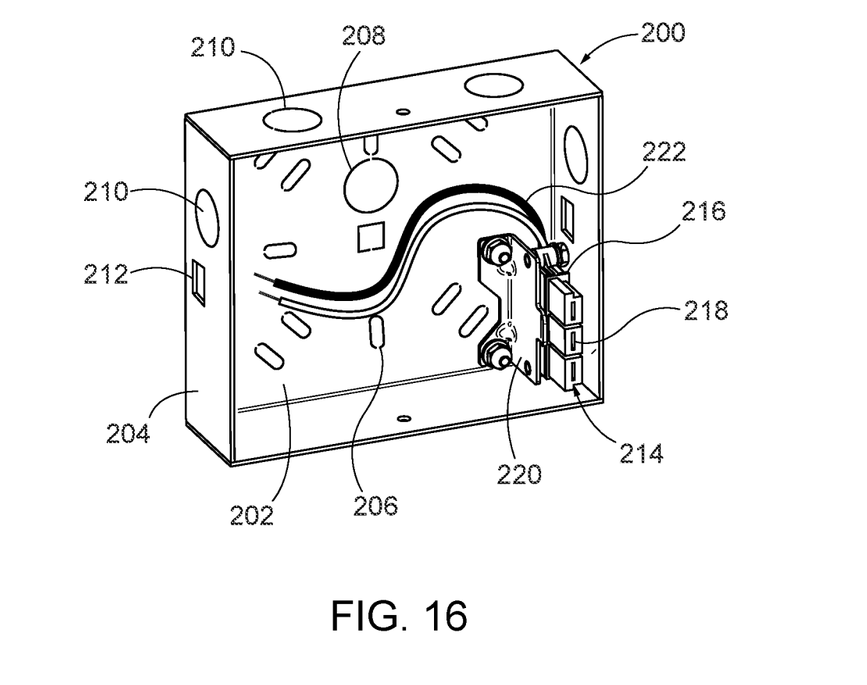
FIG. 16 front perspective view of an exemplary junction box and connector.

The mounting plate 100 is configured to mate with a junction box 200 as shown. As best shown in FIG. 16, the junction box 200 includes a rear wall 202 and a plurality of side walls 204. The rear wall 202 includes a series of apertures, for example slots 206 and circular openings 208. The slots can be used to connect the junction box 200 to a structure or other support, and the circular opening 208 can act as a conduit for mains power supply wiring. One or more of the rear wall 202 apertures can be knock-outs. The side walls 204 can also include apertures such as knock-out openings 210 that can act as wire conduits.

A slot 212 is provided two opposite side walls 204 positioned to receive the mounting arms 124. A connector 214 is provided in the junction box 200 that mates with the connector 140 positioned on the rear connector portion 136. The connector 214 is a male connector that includes a connector body 216 and a set of electrical contacts positioned in the male projections 218. The connector body 216 is coupled to a bracket 220 that is mounted to the junction box 200. A wired connection can be established between the connector 214 and power supply wiring 222.

Figure 17:
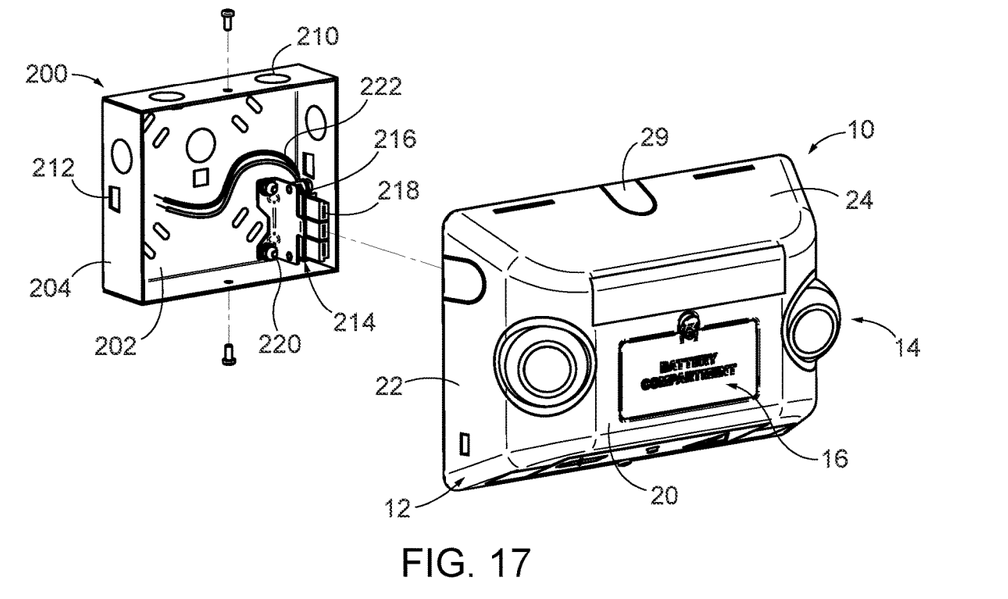
FIG. 17 is a is front perspective view of the junction box and light assembly.
Figure 18:
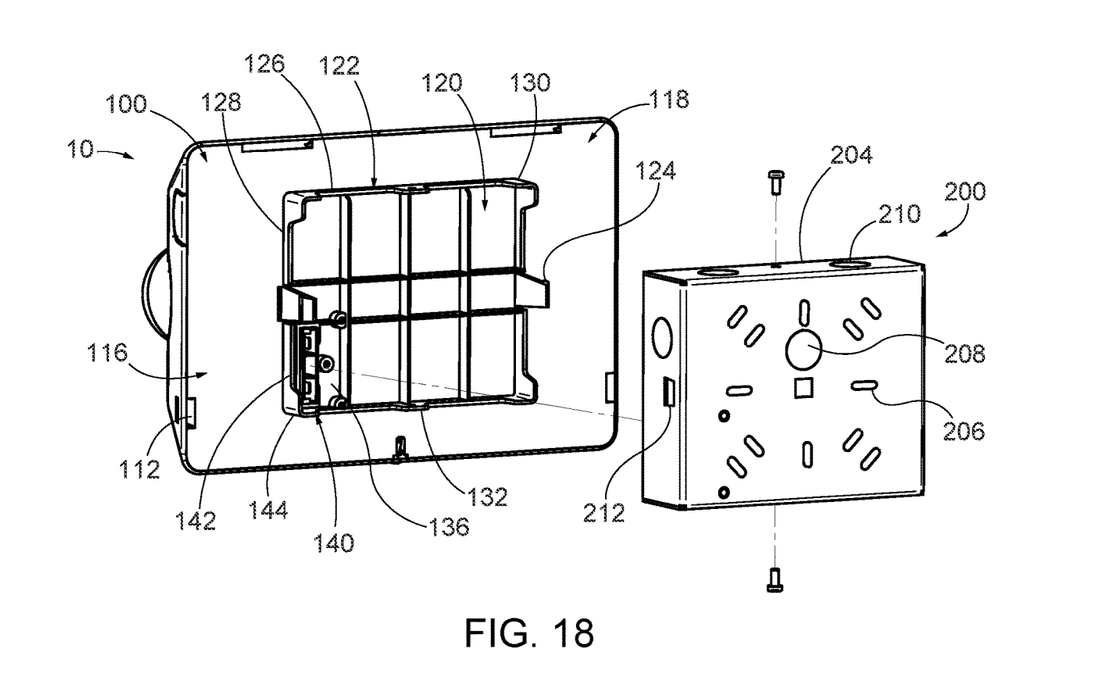
FIG. 18 is a rear perspective view of FIG. 15.

The junction box 200 can be mounted on a structure or support, such as a wall. A wired connection can be made between the junction box connector 214 and the power supply wiring 222. The junction box connector 214 can be coupled to the junction box 200, for example by securing the mounting bracket 220 to the junction box 200 with one or more fasteners. The connector 214 can be coupled to the junction box 200 before or after it is connected to the power supply wiring 222. The emergency lighting assembly 10 can be snap-fit to the junction box 200 through the connection with the mounting plate 100. The walls 122 of the mounting plate 100 fit inside of the junction box 200 and the mounting plate connector 140 is mated with the junction box connector 214. As shown in FIGS. 17 and 18, fasteners can be inserted through the side walls 204 of the junction box 200 and connect to the apertures in the central tabs 132 of the mounting plate 100 to further secure the mounting plate 100 to the junction box 200. To remove the light assembly 10, a user can press the mounting arms 124 into the junction box 200, releasing the mounting plate 100, and allowing the entire light assembly 10 to be removed as one piece. This allows for easy installation and removal of the lighting assembly 10, and can allow the lighting assembly 10 to be replaced without a user having to make a high-voltage electrical connection.

Figure 19:
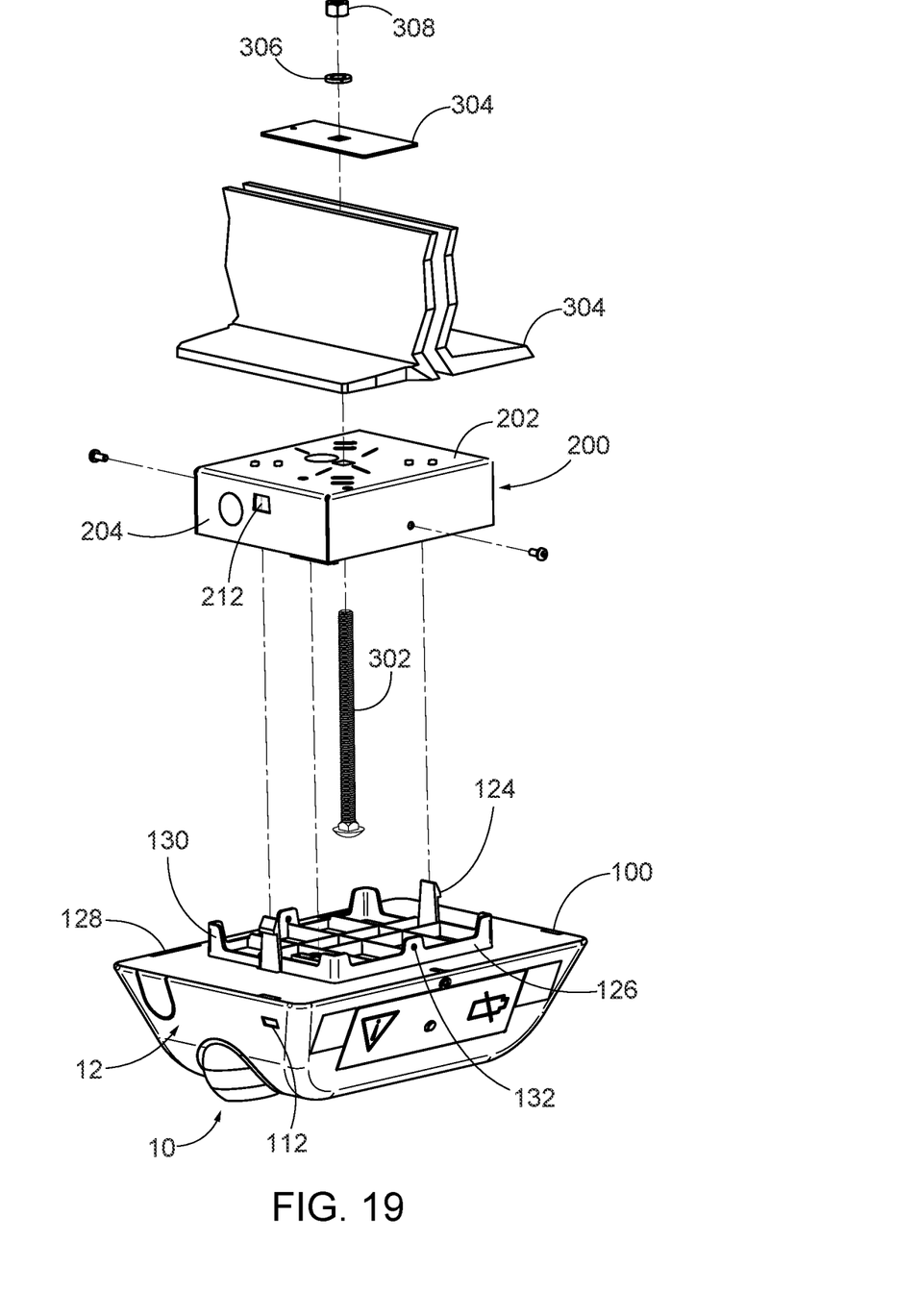
FIG. 19 is a front perspective view of an exemplary truss mounting assembly.

FIG. 19 shows an exemplary truss mounting assembly for the junction box 200 and the light assembly 10. The junction box 200 is connected to a truss member 30o through a fastener assembly. In an exemplary embodiment the fastener assembly includes a truss screw 302, a plate 304, a lock washer 306, and a nut 308. The light assembly 10 is snap-fit to the junction box 200 as described above, and one or more fasteners can be inserted through the side walls 204 of the junction box 200 and connect to the apertures in the central tabs 132 of the mounting plate 100 to further secure the mounting plate 100 to the junction box 200.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:
1. A lighting device comprising:
   a housing having a front wall and containing a high voltage connection;
   a light emitter coupled to the housing;

a battery compartment positioned in the housing and isolated from the high voltage connection, the battery compartment having an opening providing access to the compartment through the front wall;

a battery positioned in the compartment and accessible through the opening;

a mounting plate coupled to the housing opposite the front wall, the mounting plate having a front surface facing the housing and a rear surface opposite the front surface, the rear surface including a rear connector portion; and a plug-style first connector coupled to the rear connector portion and operatively coupled to the light emitter.

2. The lighting device of claim 1, wherein the mounting plate includes a snap-fit mounting feature having a cantilevered mounting arm.

3. The lighting device of claim 1, wherein the rear connector portion includes a slot and the first connector extends through the slot.

4. The lighting device of claim 1, wherein the first connector is configured to mate with a corresponding second connector.

5. The lighting device of claim 4, wherein the corresponding second connector is attached to a junction box.

6. The lighting device of claim 4, wherein the first connector includes a female plug.

7. The lighting device of claim 1, wherein the mounting plate is snap-fit to the housing.

8. The lighting device of claim 6, wherein the mounting plate includes a cantilevered arm extending from the front surface.

9. A lighting device comprising:

a housing having a front wall, a first compartment, a second compartment, and a second compartment opening providing access to the second compartment through the front wall;

a lamp connected to the housing;

a circuit connected to a high voltage connection positioned in the first compartment;

a battery positioned in the second compartment;

a low voltage connection extending from the circuit into the second compartment and connected to the battery;

a mounting plate coupled to the housing and having a front surface facing the housing and a rear surface opposite the front surface, the rear surface including a rear connector portion;

a first connector coupled to the rear connector portion and operatively connected to the lamp; and a second connector configured to be coupled to a power supply, wherein the first connector is configured to mate with the second connector.

10. The lighting device of claim 9, wherein the rear connector portion includes a slot and the first connector extends through the slot.

11. The lighting device of claim 9, wherein the first connector includes a female connector and the second connector includes a male connector.

12. The lighting device of claim 9, wherein the second connector is coupled to a mounting bracket.

13. The lighting device of claim 9, wherein a cantilevered arm extends from the rear surface of the mounting plate.

14. A lighting assembly comprising:

a light assembly having a housing at least partially defining a chamber containing a control component for a light emitter, a battery compartment positioned in the housing, a battery positioned in the battery compartment, and a mounting plate having a front portion facing the chamber and a rear portion positioned opposite the chamber, wherein a first connector extends from the rear portion;

a junction box comprising a plurality of walls; and a second connector positioned in the junction box, wherein the first connector extends into the junction box to mate with the second connector, and wherein a wall extends from the rear portion of the mounting plate into the junction box.

15. The lighting assembly of claim 14, wherein the battery is a rechargeable battery.

16. The lighting assembly of claim 14, wherein the first connector includes a female connector and the second connector includes a male connector.

17. The lighting assembly of claim 14, wherein a wall cantilevered mounting arm extends from the rear portion of the mounting plate into the junction box.

18. The lighting assembly of claim 17, wherein the wall includes a tab and an opening for receiving a fastener.

19. The lighting assembly of claim 14, wherein the second connector is coupled to a mounting bracket.

20. The lighting assembly of claim 14, wherein the battery is connected to a circuit configured to charge and discharge the battery.

* * * * *